United States Patent
Yu et al.

(10) Patent No.: US 12,079,952 B2
(45) Date of Patent: Sep. 3, 2024

(54) IMAGE PROCESSING METHOD AND SYSTEM FOR CONVOLUTIONAL NEURAL NETWORK

(71) Applicant: REALTEK SEMICONDUCTOR CORP., Hsinchu (TW)

(72) Inventors: Chia-Wei Yu, Hsinchu (TW); Kang-Yu Liu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 368 days.

(21) Appl. No.: 17/693,723

(22) Filed: Mar. 14, 2022

(65) Prior Publication Data

US 2023/0081327 A1  Mar. 16, 2023

(30) Foreign Application Priority Data

Sep. 10, 2021  (TW) .................. 110133874

(51) Int. Cl.
  *G06T 3/403*  (2024.01)
  *G06V 10/774*  (2022.01)
  *G06V 10/82*  (2022.01)

(52) U.S. Cl.
  CPC ............ *G06T 3/403* (2013.01); *G06V 10/774* (2022.01); *G06V 10/82* (2022.01)

(58) Field of Classification Search
  CPC ...... G06T 3/403; G06V 10/774; G06V 10/82; G06V 10/454
  USPC ....................................................... 382/300
  See application file for complete search history.

(56) References Cited

U.S. PATENT DOCUMENTS

2007/0237425 A1*  10/2007  Taguchi ................ G06T 3/4084
                                                                382/299

OTHER PUBLICATIONS

Wang et al., "Deep Network Interpolation for Continuous Imagery Effect Transition", Nov. 26, 2018, p. 1-17.
Wang et al., "ESRGAN: Enhanced Super-Resolution Generative Adversarial Networks", Sep. 17, 2018, p. 1-23.

* cited by examiner

*Primary Examiner* — Stephen P Coleman
(74) *Attorney, Agent, or Firm* — Birch, Stewart, Kolasch & Birch, LLP

(57) ABSTRACT

A system is adapted to perform an image processing method. The processing method includes: obtaining input image data, a first training result, a second training result, and an interpolation lookup table; segmenting the input image data into a plurality of feature blocks according to a total quantity of area interpolations; establishing a position mapping relationship to record the feature blocks corresponding to positions of all of the area interpolations; assigning corresponding area interpolations to the feature blocks according to the position mapping relationship; obtaining an interpolation parameter for each of the feature blocks according to the first training result, the second training result, and the area interpolation; performing block convolution on each of the interpolation parameters and the corresponding feature block to obtain an output feature result; and obtaining an output image by combining the output feature results according to the position mapping relationship.

11 Claims, 11 Drawing Sheets

IMAGE PROCESSING METHOD AND SYSTEM FOR CONVOLUTIONAL NEURAL NETWORK

CROSS-REFERENCE TO RELATED APPLICATION

This non-provisional application claims priority under 35 U.S.C. § 119(a) to Patent Application No. 110133874 filed in Taiwan, R.O.C. on Sep. 10, 2021, the entire contents of which are hereby incorporated by reference.

BACKGROUND

Technical Field

Disclosed is a digital image processing method and system, and in particular, to an image processing method and system for a convolutional neural network (CNN).

Related Art

As a deep neural network emerges, the industry develops a plurality of different learning algorithms. The learning algorithms evolved from the original neural network to a current CNN. Generally, the learning algorithms are based on feature recognition and classification and feedback processing. Thus, the learning algorithms are usually applied to feature classification and determining of digital information. For example, the learning algorithms are applied to digital image processing.

SUMMARY

In view of the above, according to some embodiments, an image processing method for a CNN includes: obtaining input image data, a first training result, a second training result, and an interpolation lookup table, where the interpolation lookup table includes a plurality of area interpolations; segmenting the input image data into a plurality of feature blocks according to a total quantity of the area interpolations; establishing a position mapping relationship to record the feature blocks corresponding to positions of all of the area interpolations; assigning corresponding area interpolations to the feature blocks according to the position mapping relationship; obtaining an interpolation parameter for each of the feature blocks according to the first training result, the second training result, and the area interpolations; performing block convolution on each of the interpolation parameters and the corresponding feature block to obtain an output feature result; and obtaining an output image by combining the output feature results according to the position mapping relationship. In the image processing method for a CNN, the input image data is segmented into a plurality of feature blocks, to reduce an operation workload during image processing.

In some embodiments, before the step of obtaining the interpolation lookup table, the image processing method includes: selecting a first convolutional operation layer of a CNN; and inputting the input image data to the first convolutional operation layer.

In some embodiments, the step of obtaining the output image includes: selecting a second convolutional operation layer of the CNN; setting the output image obtained in the first convolutional operation layer as new input image data of the second convolutional operation layer; and obtaining the output image of the second convolutional operation layer.

In some embodiments, before the step of obtaining the interpolation lookup table, the image processing method includes: respectively configuring corresponding interpolation lookup tables for the first convolutional operation layer and the second convolutional operation layer; and selecting a corresponding one of the interpolation lookup tables according to the first convolutional operation layer or the second convolutional operation layer.

In some embodiments, the step of segmenting the input image data into a plurality of feature blocks according to the total quantity of the area interpolations includes: calculating a first area of each of the feature blocks according to the interpolation quantity and the input image data; and enlarging the first area of each of the feature blocks to a second area to form an overlapping region between two adjacent feature blocks.

In some embodiments, the step of obtaining the output image by combining the interpolation parameters according to the position mapping relationship includes: superimposing the overlapping regions corresponding to two adjacent interpolation parameters according to the position mapping relationship; and obtaining the output image.

In some embodiments, the step of obtaining the interpolation parameter for each of the feature blocks according to the first training result, the second training result, and the area interpolations includes: assigning a first temporary area interpolation to each of the corresponding feature blocks according to the first training result and the position mapping relationship; assigning a second temporary area interpolation to each of the corresponding feature blocks according to the second training result and the position mapping relationship; and obtaining the interpolation parameter of a corresponding position according to the first training result, the second training result, the first temporary area interpolation, and the second temporary area interpolation.

In some embodiments, an image processing system includes a storage unit and a processor. The storage unit is configured to store a CNN program, input image data, at least one interpolation lookup table, a first training result, a second training result, and an output image. The interpolation lookup table includes a plurality of area interpolations, and a total quantity of the area interpolations is an interpolation quantity. The processor is configured to execute the CNN program according to the input image data and the interpolation lookup table. The processor segments the input image data into a plurality of feature blocks according to the interpolation quantity and a position mapping relationship, assigns a corresponding area interpolation to each of the feature blocks according to the position mapping relationship, calculates an interpolation parameter of each of the feature blocks according to the first training result, the second training result, and the area interpolations, and obtains the output image by combining the interpolation parameters according to the position mapping relationship. The image processing system for a CNN segments the input image data into a plurality of feature blocks, to reduce an operation workload of the processor during image processing.

In some embodiments, the CNN program includes a first convolutional operation layer and a second convolutional operation layer. An output of the first convolutional operation layer is connected to the second convolutional operation layer, and the first convolutional operation layer and the second convolutional operation layer respectively have the interpolation lookup table.

In some embodiments, the processor inputs the input image data to the first convolutional operation layer, and selects the corresponding interpolation lookup table according to the first convolutional operation layer.

In some embodiments, a first area of each of the feature blocks is calculated according to the interpolation quantity and the input image data, and is enlarged to a second area to form an overlapping region between two adjacent feature blocks. The processor calculates the interpolation parameters in the overlapping region according to the first training result, the second training result, and the area interpolations, and obtains the output image according to the position mapping relationship.

In summary, according to the image processing method and system for a CNN, new interpolation parameters are obtained by means of adjustment by using a plurality of sets of training results and area interpolations, and the output features of the feature blocks are further obtained according to the new interpolation parameters. In addition, by segmenting the input image data, the processor can use all operation resources on the processing of the feature blocks, so as to reduce the operation workload of the processor for large input samples.

DETAILED DESCRIPTION

Figure 1A:
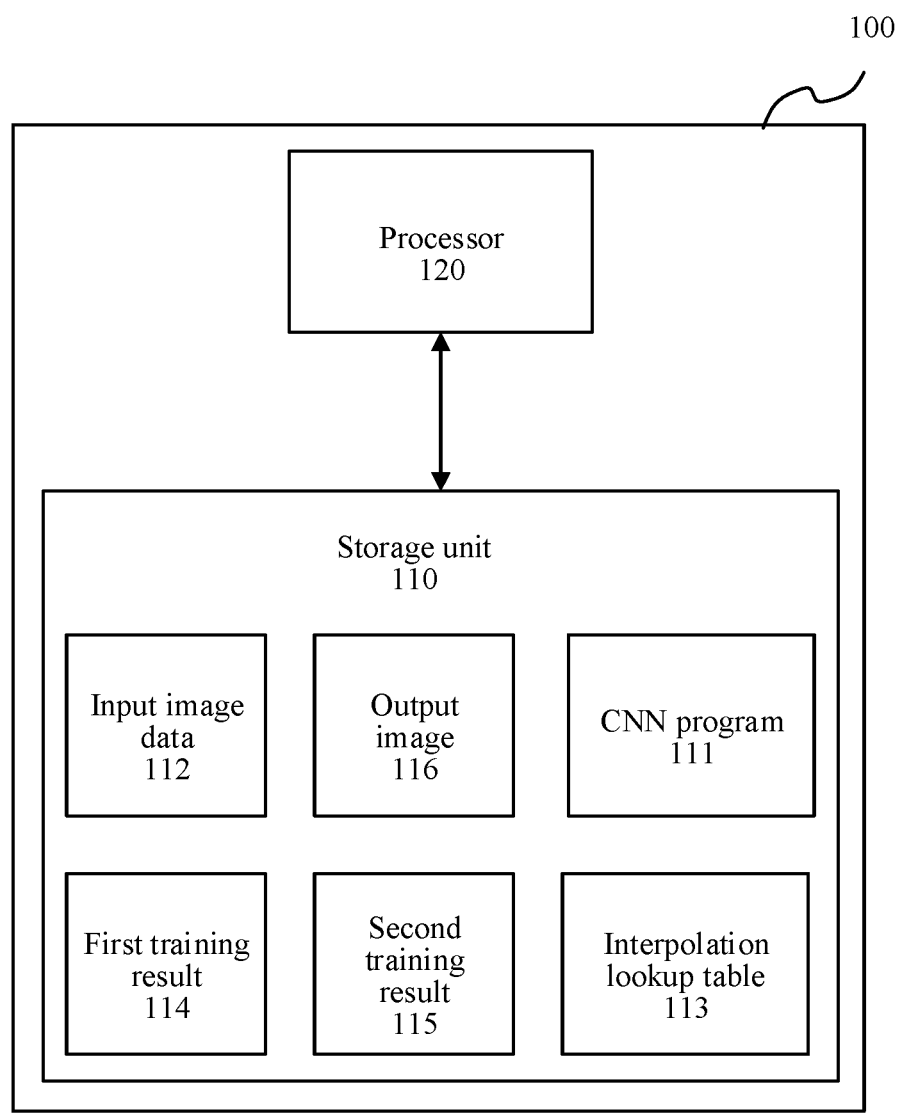
FIG. 1A is a schematic functional block diagram of an embodiment of an image processing system.

FIG. 1A is a schematic functional block diagram of an embodiment of an image processing system. An image processing system 100 may be implemented by a personal computer or a server, and may also be applied to an embedded controller or a system on a chip. The image processing system 100 includes a storage unit 110 and a processor 120. The storage unit 110 stores a CNN program 111, input image data 112, at least one interpolation lookup table 113, a first training result 114, a second training result 115, and an output image 116. In an embodiment, the internal processing of a convolutional operation layer is used as an example for description, as shown by a dashed-line box in FIG. 1B.

The CNN program 111 assigns an interpolation lookup table 113 according to the operation processing layer. The interpolation lookup table 113 includes a plurality of area interpolations 117, as shown in FIG. 1C. For ease of explanation, in FIG. 1C, a two-dimensional array is used as a set and a representation of the area interpolations 117. A left upper corner of the interpolation lookup table 113 is an original point, and $\alpha(x,y)$ is the area interpolation 117, where x and y respectively correspond to a number on a horizontal axis and a number on a longitudinal axis of the interpolation lookup table 113. For example, the area interpolation $\alpha(1,0)$ corresponds to a second column and a first row of the interpolation lookup table 113. In addition, the interpolation lookup table 113 may also be represented by using a one-dimensional array or a three-dimensional array.

The input image data 112 is an image file on which the CNN program 111 is to perform image processing. The output image 116 is an output result after processing by the CNN program 111. The output result is determined according to the convolutional operation layer.

The first training result 114 is a training sample generated by a first digital image processing program. The second training result 115 is a training sample generated by a second digital image processing program. The first digital image processing program and the second digital image processing program may be, but are not limited to enhanced super-resolution, denoise, image-to-image translation, style transfer, or semantic translation. The first digital image processing program and the second digital image processing program are different image processing programs, or similar image processing programs generated by using different training information.

Figure 2:
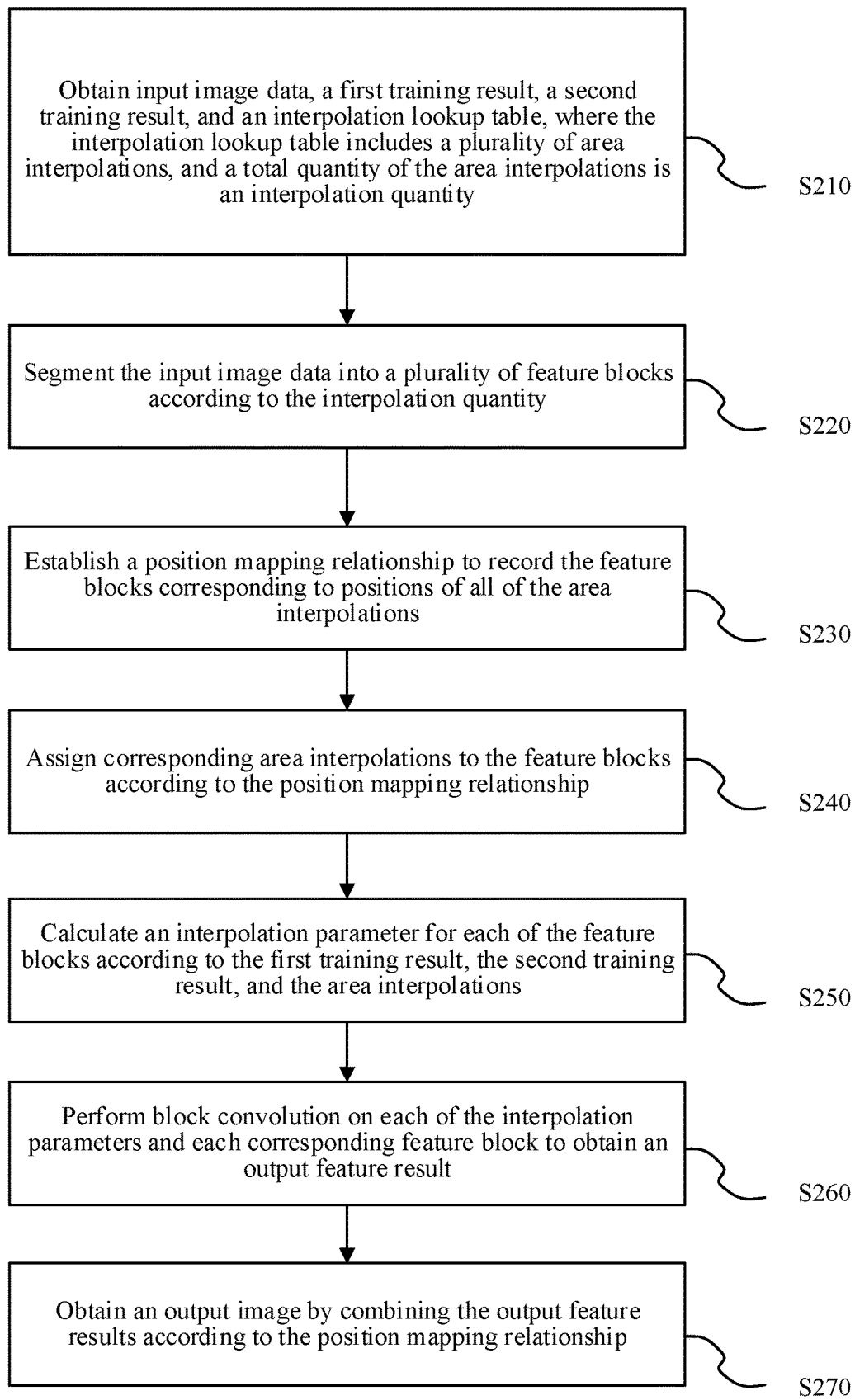
FIG. 2 is a schematic flowchart of an embodiment of an image processing method.

FIG. 2 is a schematic flowchart of an embodiment of an image processing method. An image processing method for a CNN includes the following steps.

Step S210: Obtain input image data, a first training result, a second training result, and an interpolation lookup table, where the interpolation lookup table includes a plurality of area interpolations, and a total quantity of the area interpolations is an interpolation quantity.

Step S220: Segment the input image data into a plurality of feature blocks according to the interpolation quantity.

Step S230: Establish a position mapping relationship to record the feature blocks corresponding to positions of all of the area interpolations.

Step S240: Assign corresponding area interpolations to the feature blocks according to the position mapping relationship.

Step S250: Obtain an interpolation parameter for each of the feature blocks according to the first training result, the second training result, and the area interpolations.

Step S260: Perform block convolution on each of the interpolation parameters and the corresponding feature block to obtain an output feature result.

Step S270: Obtain an output image by combining the output feature results according to the position mapping relationship.

Figure 3A:
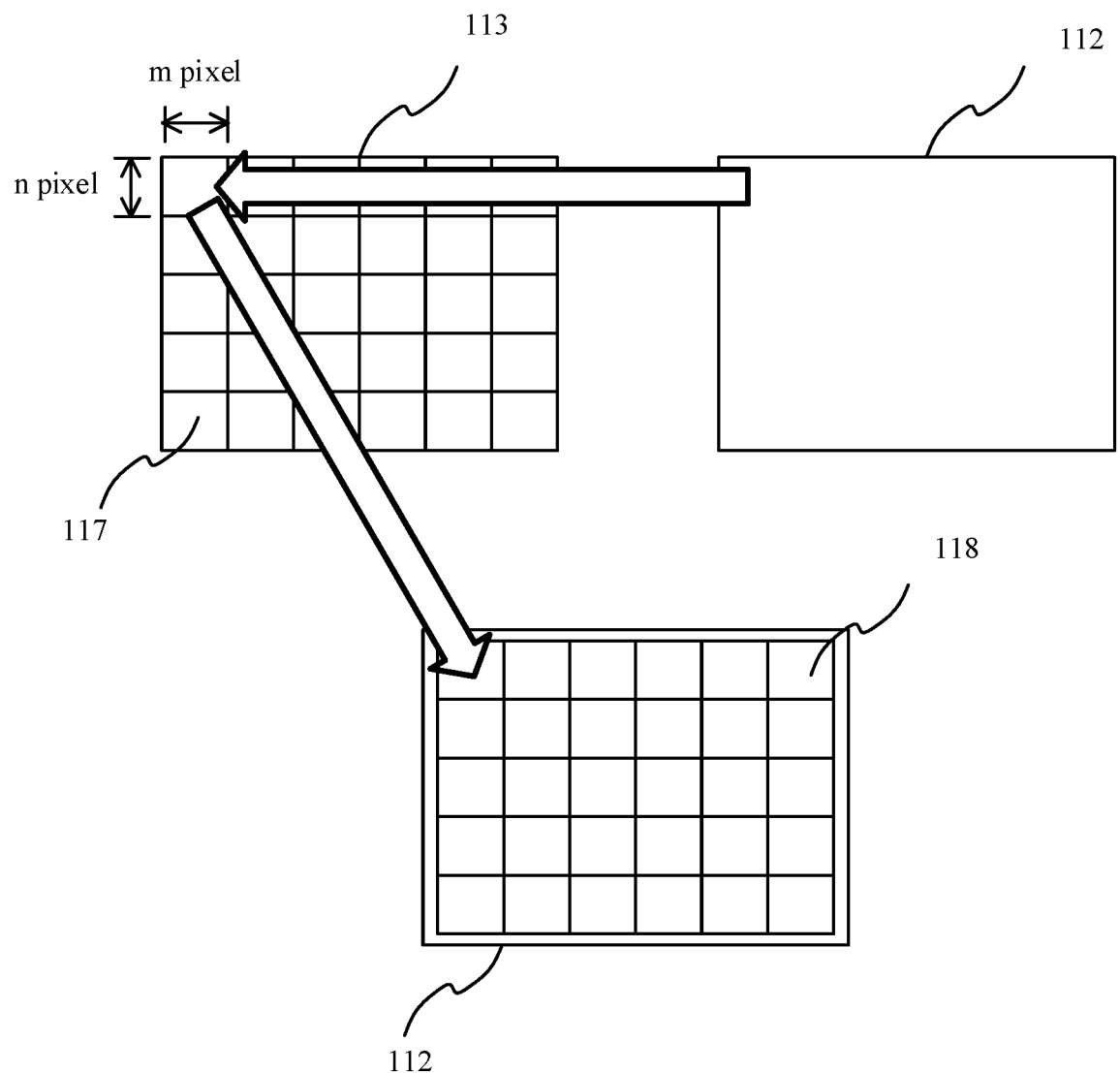
FIG. 3A is a schematic diagram of an embodiment of segmentation of input image data and feature blocks of an image processing method.

Firstly, the processor 120 performs the CNN program 111, and loads the input image data 112, the first training result 114, the second training result 115, and the interpolation lookup table 113 from the storage unit 110. The interpolation lookup table 113 includes a plurality of area interpolations 117, as shown in FIG. 1C. The total quantity of the area interpolations 117 is an interpolation quantity. The processor 120 segments the input image data 112 into feature blocks 118 of a quantity same as the interpolation quantity, as shown in FIG. 3A. Sizes of the feature blocks 118 are determined according to the input image data 112 and the interpolation quantity. In FIG. 3A, the input image data 112 and the interpolation lookup table 113 are represented by using two-dimensional arrays. The size of each of the feature blocks 118 is an n*m pixel, where n and m are positive integers. An upper right portion of FIG. 3A shows input image data 112 before segmentation. An upper left portion of FIG. 3A shows the interpolation lookup table 113. A lower portion of FIG. 3A shows the input image data 112 before segmentation (that is, a set of the feature blocks 118). Arrows in FIG. 3A represent corresponding positions of the input image data 112 and the interpolation lookup table 113.

During segmentation to obtain the feature blocks 118, the CNN program 111 establishes a position mapping relationship according to positions of the area interpolations 117 of the interpolation lookup table 113 and the corresponding area interpolations 117. The input image data 112 is segmented according to the interpolation lookup table 113. Therefore, the arrangement of the feature blocks 118 may be deemed to be the same as the arrangement of the area interpolations 117 of the interpolation lookup table 113. Thus, each area interpolation 117 can be mapped to a corresponding feature block 118. The CNN program 111 assigns the corresponding area interpolations 117 to the feature blocks 118 according to the position mapping relationship. In other words, the position mapping relationship shows the positions of the feature blocks 118 and the corresponding area interpolations 117.

Figure 3B:
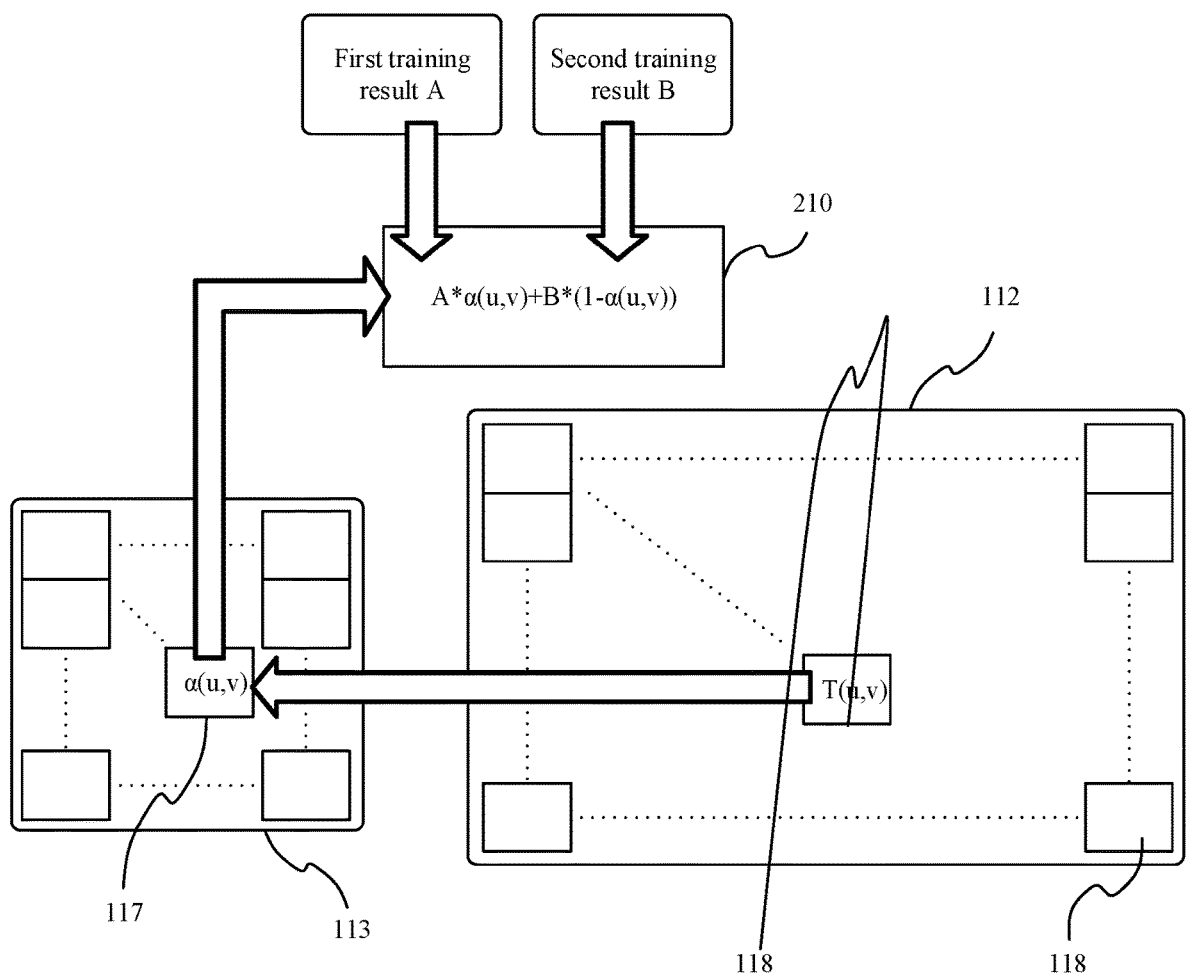
FIG. 3B is a schematic generation diagram of an embodiment of an interpolation parameter of an image processing method.

Next, the CNN program 111 calculates an interpolation parameter 210 for each of the feature blocks 118 according to the first training result 114, the second training result 115, and the area interpolations 117. It is assumed that content of the first training result 114 is "A", which is referred to as a first training result A below, where A={a0, a1 ..., an}, and content of the second training result 115 is "B", which is referred to as a second training result B, where B={b0, b1 ..., bn}. Each of the area interpolations 117 is $\alpha(u,v)$, where $u \in \{0\text{-}x\}$, and $v \in \{0\text{-}y\}$. The area interpolation 117 of the corresponding position of the feature block $T(u,v)$ 118 is obtained according to the positions of u and v. The CNN program 111 performs interpolation calculation according to the first training result A, the second training result B, and the area interpolation $\alpha(u,v)$, as shown in FIG. 3B. The CNN program 111 obtains the corresponding area interpolation $\alpha(u,v)$ according to the feature block $T(u,v)$ 118. The CNN program 111 performs interpolation calculation on the first training result A, the second training result B, and the area interpolations $\alpha(u,v)$, to obtain an interpolation parameter $I_n(u,v)$, as shown in the following equation 1.

Interpolation parameter $I_n(u,v) = A*\alpha(u,v) + B*(1-\alpha(u,v))$   Equation 1

In other words, the interpolation parameter I is formed by array elements {i0, i1 ..., in}. The equation 1 is a set of the interpolation parameters I. The interpolation parameters of the set may be expressed as follows:

$I_n(u,v) = a_n*\alpha(u,v) + b_n*(1-\alpha(u,v))$   Equation 2

According to the above equations 1 and 2, the first training result A and the second training result B each include a plurality of sets of the interpolation parameters 210. For example, the first training result A includes the following sets of interpolation parameters 210:

I0(u,v)=a0*α(u,v)+b0*(1−α(u,v));
I1(u,v)=a1*α(u,v)+b1*(1−α(u,v));
...
In(u,v)=an*α(u,v)+bn*(1−α(u,v)).

The CNN program 111 repeatedly obtains the corresponding area interpolations 117 for other feature blocks 118, and calculates the corresponding interpolation parameters 210. After obtaining the interpolation parameter I(u,v) of the feature block T(u,v) 118, the CNN program 111 performs block convolution 310 on the feature block 118 according to the interpolation parameter I(u,v), to obtain an output feature result 320. The CNN program 111 repeatedly calculates the interpolation parameters 210 for other feature blocks 118, to obtain the output feature results 320 of the feature blocks 118.

Figure 3C:
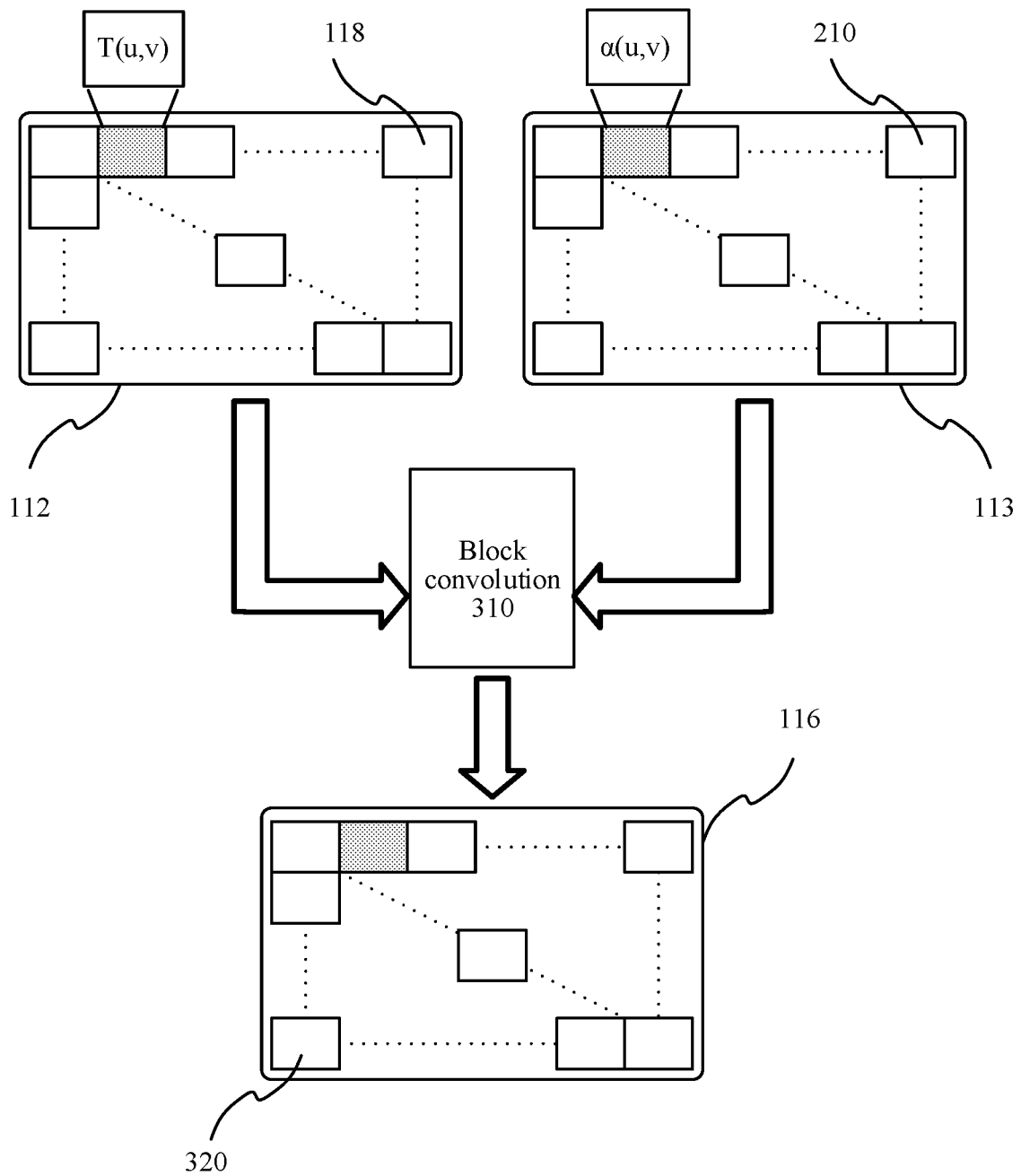
FIG. 3C is a schematic generation diagram of an output feature result of an embodiment of an image processing method.

Finally, the CNN program 111 combines all of the output feature results 320 according to the position mapping relationship, as shown in FIG. 3C. In other words, the CNN program 111 writes the corresponding output feature results 320 into corresponding positions of the output image 116 according to the feature blocks 118 and the position mapping relationship. In FIG. 3C, the feature block 118 in the input image data 112, the interpolation parameter 210 of the corresponding position, and the output feature result 320 of the corresponding position are represented by using gray blocks.

Figure 4A:
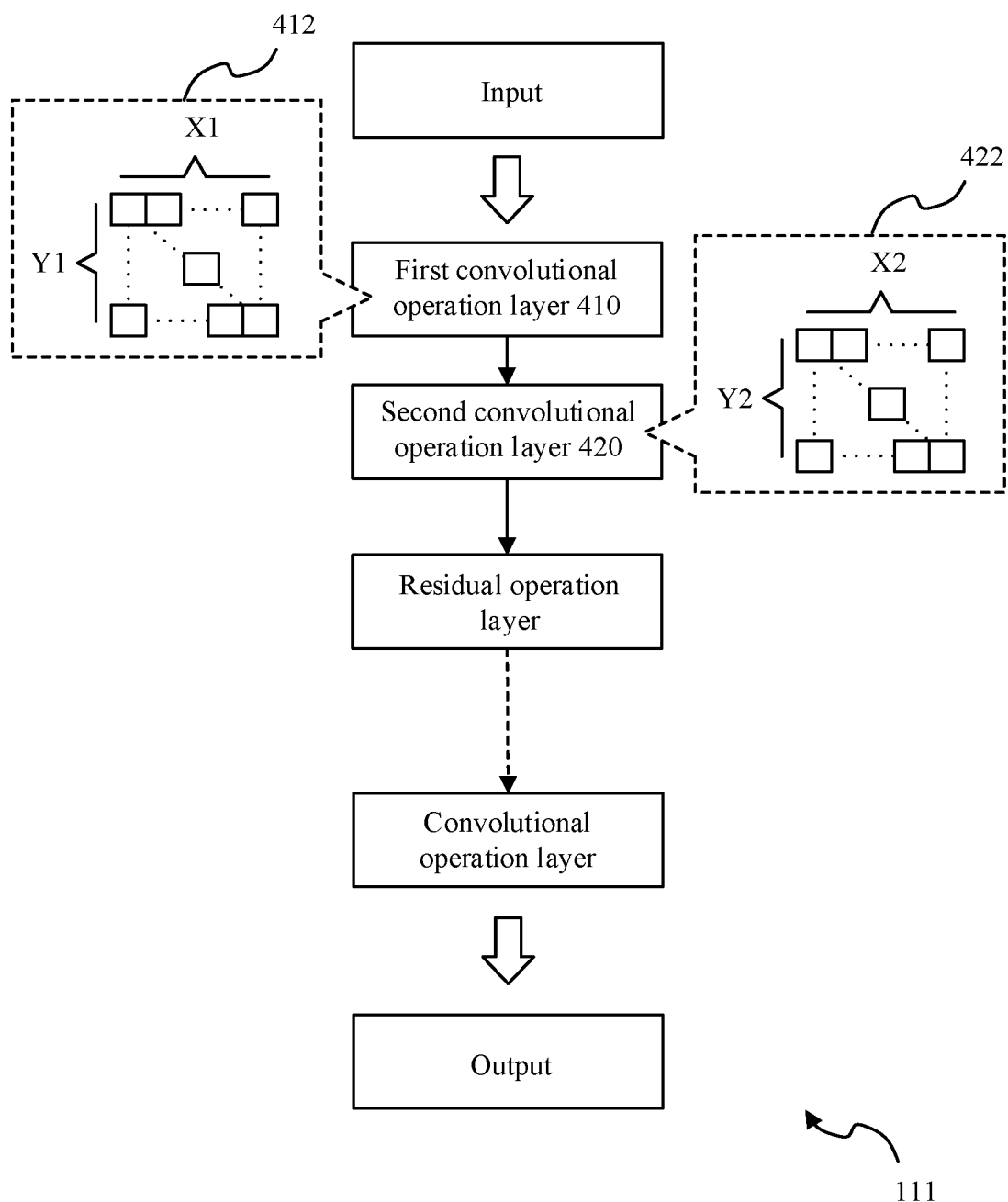
FIG. 4A is a schematic diagram of a plurality of convolutional operation layers of an embodiment of an image processing method.
Figure 4B:
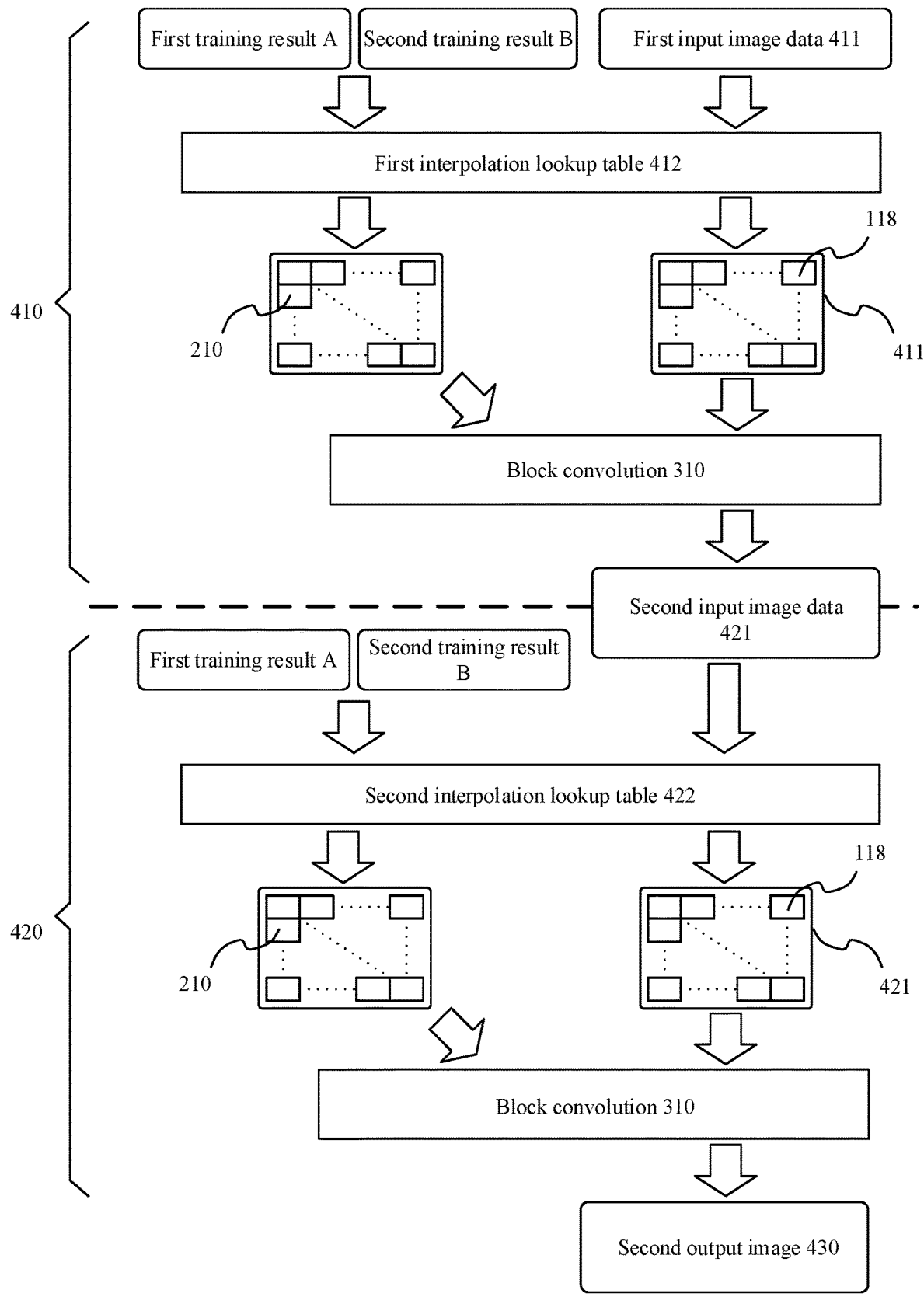
FIG. 4B is a schematic operation diagram of each convolutional operation layer of an embodiment of an image processing method.

In some embodiments, the CNN program 111 includes a plurality of convolutional operation layers. Two convolutional operation layers are connected to each other, as shown in FIG. 4A and FIG. 4B. The convolutional operation layers connected in sequence are respectively referred to as a first convolutional operation layer 410 and a second convolutional operation layer 420 for distinguishment. The first convolutional operation layer 410 is configured to process first input image data 411. The second convolutional operation layer 420 is configured to process second input image data 421. A first interpolation lookup table 412 is configured corresponding to the first convolutional operation layer 410. A second interpolation lookup table 422 is configured corresponding to the second convolutional operation layer 420. An interpolation quantity of the first interpolation lookup table 412 is not necessarily same as an interpolation quantity of the second interpolation lookup table 422.

The first interpolation lookup table 412 and the second interpolation lookup table 422 are both represented by using two-dimensional arrays. The interpolation quantity of the first interpolation lookup table 412 is Z1, where Z1=X1*Y1, X1 is a quantity in a horizontal axis of the first interpolation lookup table 412, and Y1 is a quantity in a longitudinal axis of the first interpolation lookup table 412. The interpolation quantity of the second interpolation lookup table 422 is Z2, where Z2=X2*Y2, X2 is a quantity in a horizontal axis of the second interpolation lookup table 422, Y2 is a quantity in a longitudinal axis of the second interpolation lookup table 422, X1≠X2, and Y1≠Y2. The area interpolations 117 of the first interpolation lookup table 412 are represented as α(u,v), and the area interpolations 117 of the second interpolation lookup table 422 are represented as β(u,v), where u∈{0-x}, and y∈{0-y}.

Firstly, the CNN program 111 loads the first input image data 411 to the first convolutional operation layer 410. The CNN program 111 invokes the first interpolation lookup table 412 according to the first convolutional operation layer 410. The CNN program 111 segments the first input image data 411 into a plurality of feature blocks 118 according to the first interpolation lookup table 412. The CNN program 111 obtains a corresponding area interpolation α(u,v) of each of the feature blocks 118 according to the first interpolation lookup table 412 and the position mapping relationship. The CNN program 111 performs the foregoing calculation on each area interpolation 117, the first training result A, and the second training result B, to obtain the corresponding interpolation parameter 210 of each of the feature blocks 118.

The CNN program 111 performs block convolution 310 according to the feature blocks 118 and the interpolation parameters 210 of the corresponding positions, so as to obtain the output feature results 320. When the block convolution 310 has been performed on all of the feature blocks 118 and the interpolation parameters 210, the CNN program 111 combines the output feature results 320 in sequence according to the position mapping relationship, so as to obtain a first output image (corresponding to the following second input image data 421).

Figure 1B:
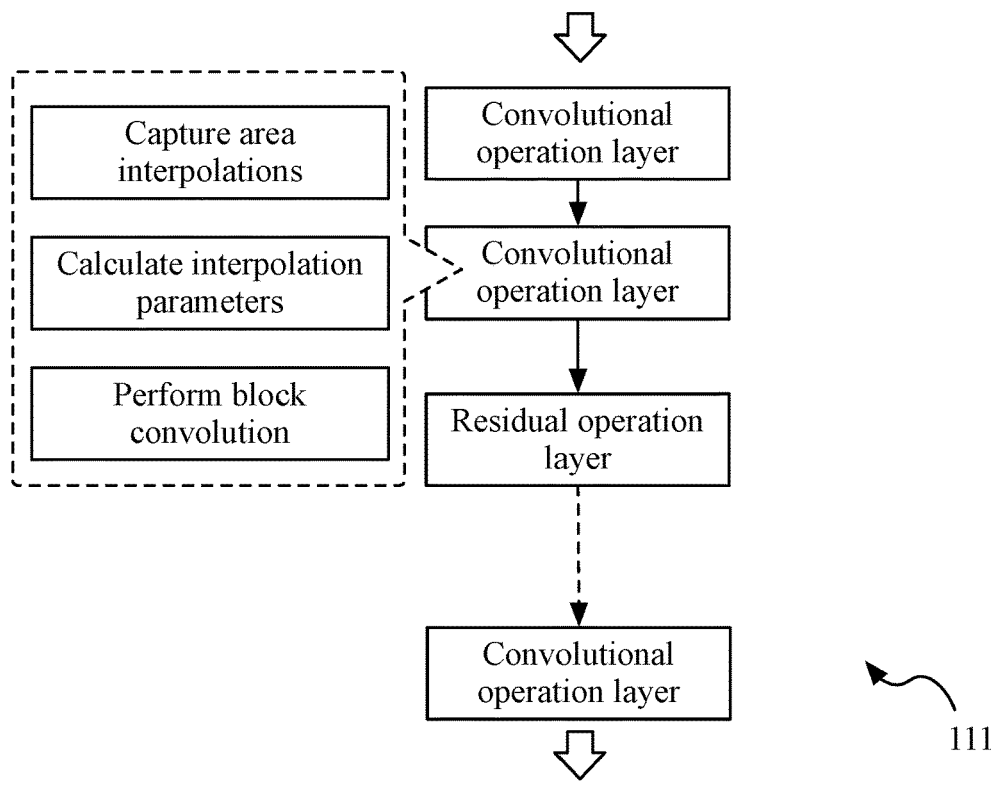
FIG. 1B is a schematic diagram of an embodiment of a single convolutional operation layer of an image processing system.
Figure 1C:
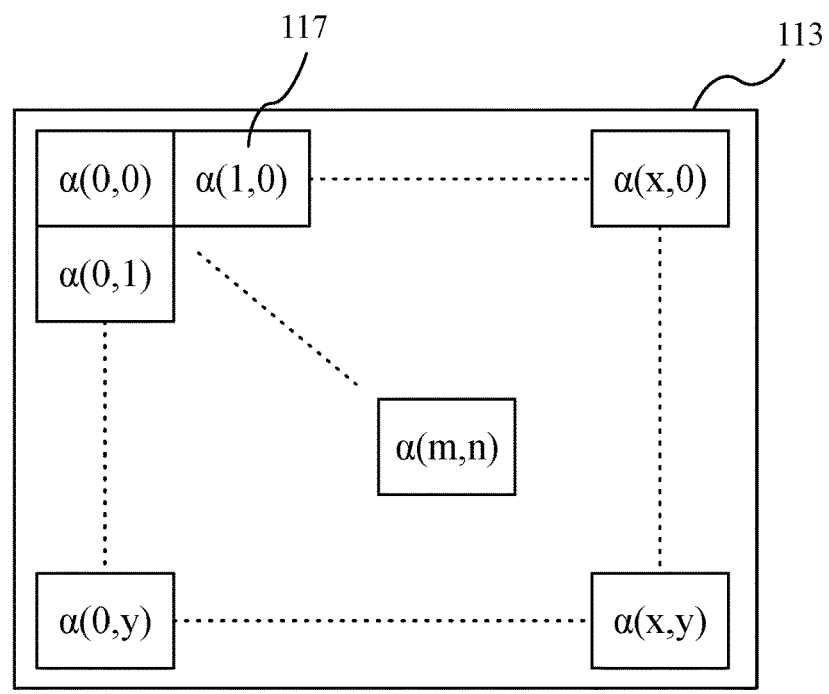
FIG. 1C is a schematic diagram of an embodiment of an interpolation lookup table and an area interpolation of an image processing system.
Figure 4C:
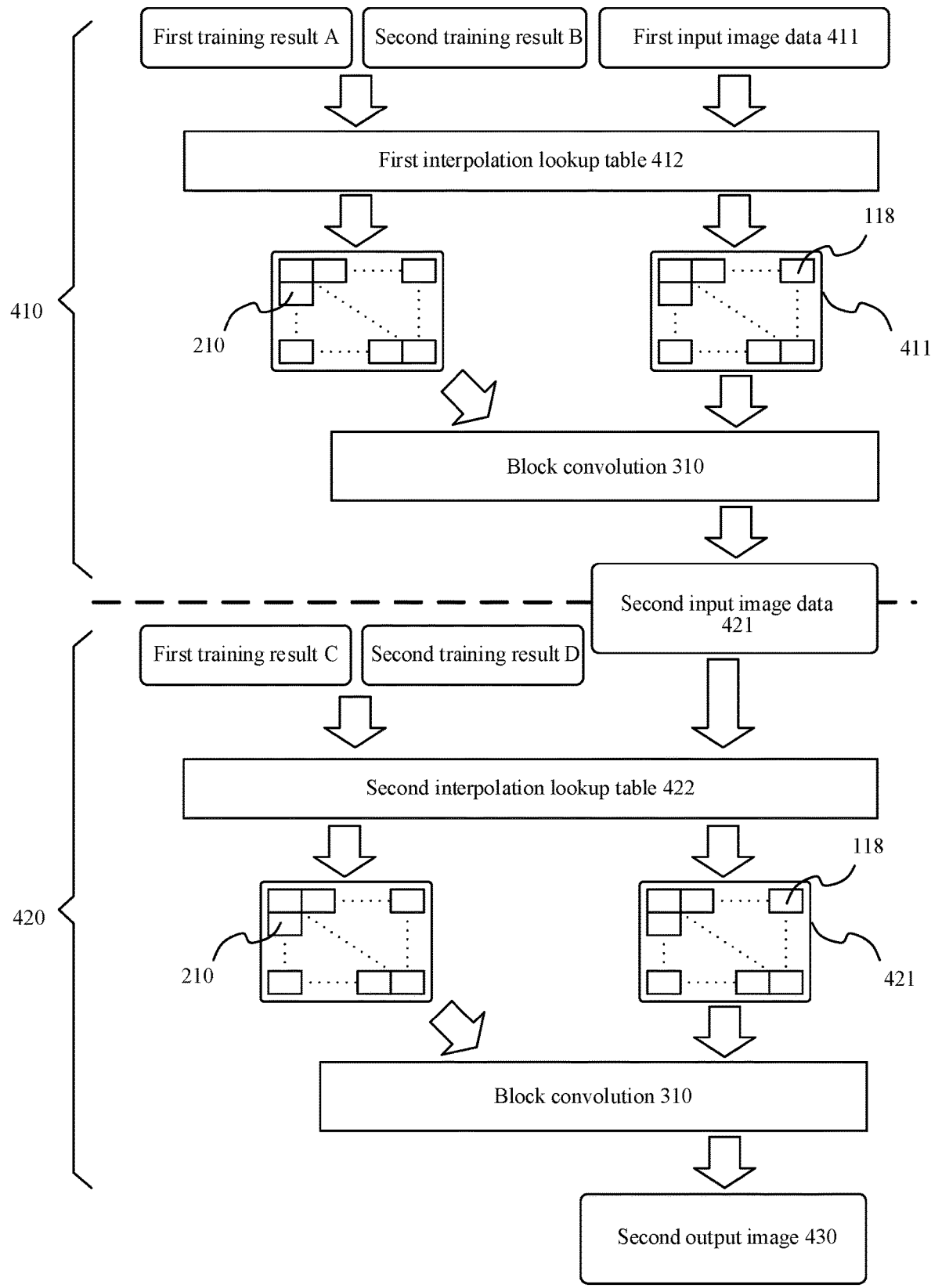
FIG. 4C is a schematic operation diagram of each convolutional operation layer of an embodiment of an image processing method.

Since the first convolutional operation layer 410 is connected to the second convolutional operation layer 420, referring to both FIG. 1B and FIG. 4B, the CNN program 111 may use the first output image as the second input image data 421. The CNN program 111 invokes the second interpolation lookup table 422, and segments the second input image data 421. During the processing of the second convolutional operation layer 420, in addition to the second interpolation lookup table 422, the CNN program 111 may also selectively invoke other training results. During the processing of the second convolutional operation layer 420 in FIG. 4B, the CNN program 111 selects a first training result C and a second training result D as a reference for calculating the interpolation parameters 210, as shown in FIG. 4C. Finally, the CNN program 111 obtains a second output image 430 outputted by the second convolutional operation layer 420.

In other words, the CNN program 111 may perform the foregoing processing on the plurality of convolutional operation layers connected to each other. The CNN program 111 uses the output image 116 of the first convolutional operation layer 410 as the input image data 112 of the next convolutional operation layer. After passing through the plurality of convolutional operation layers, borders of the feature blocks 118 can be spliced together, so that the borders of the two adjacent feature blocks 118 do not appear visually discontinuous.

In some embodiments, the following changes may be performed during the segmentation of the input image data 112 into the feature blocks 118. When the CNN program 111 segments the input image data 112 according to the interpolation quantity, the CNN program 111 calculates a first area of each of the feature blocks 118 according to the interpolation quantity and the input image data 112. Next, the CNN program 111 increases the first area of the feature block 118 to a second area.

For example, if the first area of the feature block 118 is a 3*5-pixel size and a size of a convolutional network is 3*3, the CNN program 111 increases the first area to a 5*7-pixel size according to the size of the convolutional network, and an output of the 3*5-pixel size is maintained after the processing by the CNN program 111, to ensure that the outputted feature blocks 118 do not shift or overlap. The area may be increased by means of padding or by using a pixel of an adjacent block.

The CNN program 111 obtains the area interpolations 117 according to the feature blocks 118 and the position mapping relationship, and obtains the interpolation parameters 210 of the corresponding positions. The CNN program 111 performs expansion according to a convolutional dimension, and performs block convolution 310 on each interpolation parameter 210 and the corresponding feature block 118, to obtain the output feature result 320.

Figure 5:
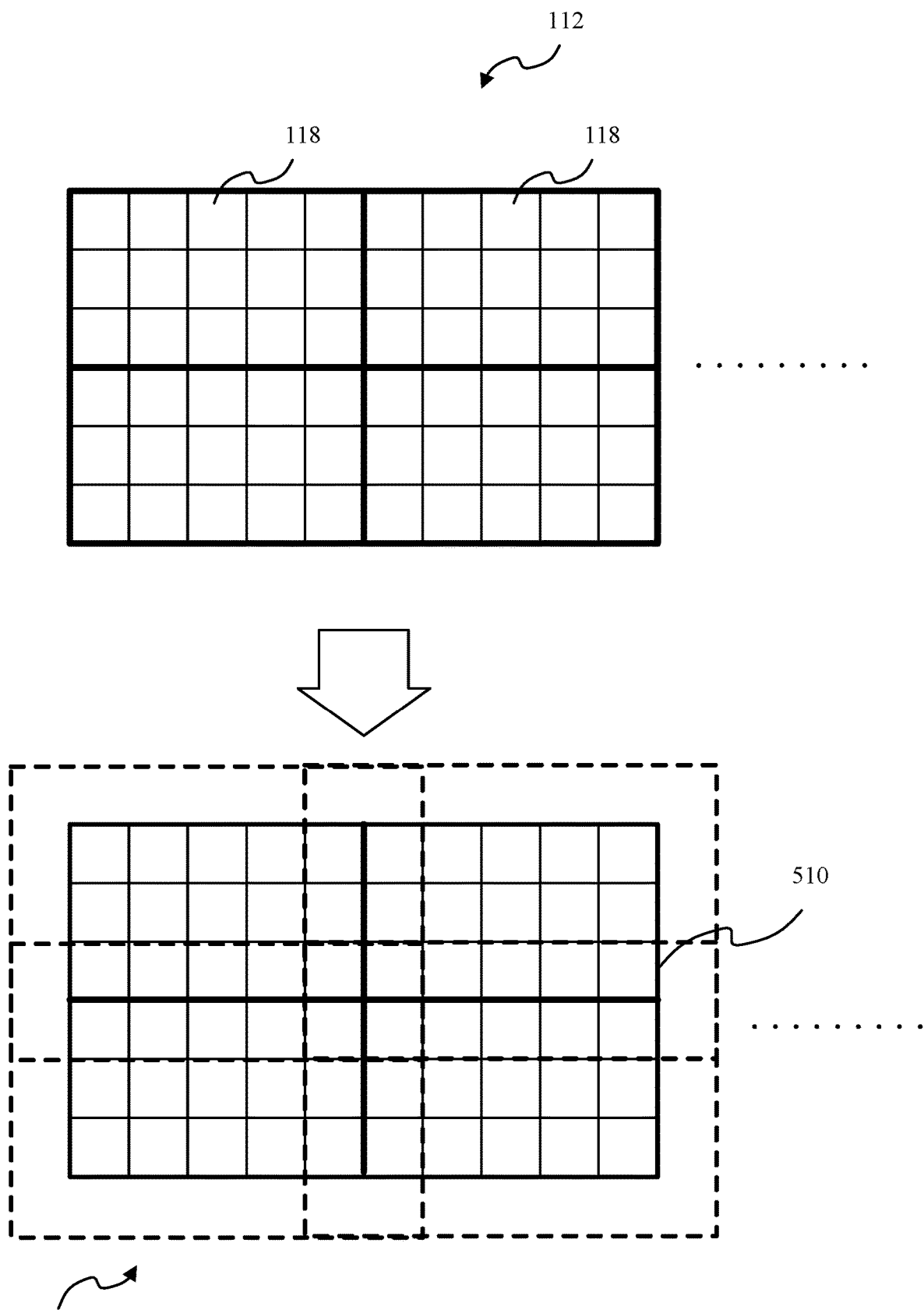
FIG. 5 is a schematic enlargement diagram of feature blocks of an embodiment of an image processing method.

The CNN program 111 obtains the area interpolations 117 according to the feature blocks 118 and the position mapping relationship, and obtains the interpolation parameters 210 of the corresponding positions. The CNN program 111 performs block convolution 310 on each interpolation parameter 210 and the corresponding feature block 118, to obtain the output feature result 320. Since an overlapping region 510 (shown in FIG. 5) exists between the feature blocks 118, when combining the output images 116, the CNN program 111 correspondingly processes the overlapping region 510 according to the interpolation parameters 210, to obtain the output feature result 320.

In some embodiments, the CNN program 111 may set a plurality of sets of the area interpolations 117, and generate a corresponding interpolation lookup table 620. The interpolation lookup table 620 includes a plurality of sets of training samples and corresponding area interpolations 117. The CNN program 111 calculates interpolation parameters 610 according to respective training results. In other words, the CNN program 111 may calculate interpolations for a plurality of sets of training results during convolutional operation in one layer.

Figure 6:
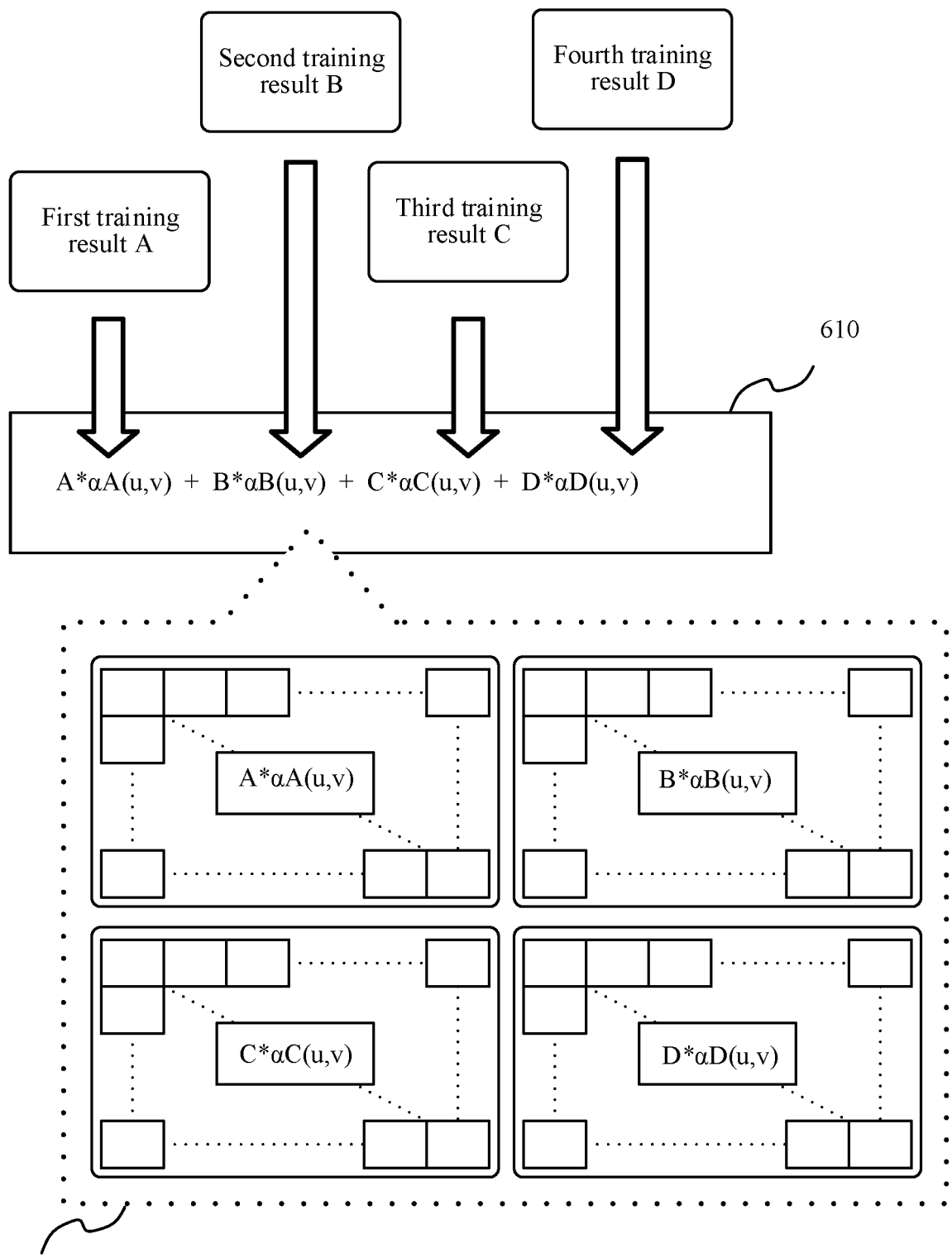
FIG. 6 is a schematic diagram of a plurality of sets of training results and corresponding area interpolations of an embodiment of an image processing method.

In this embodiment, the area interpolation is an, where n∈{A, B, C, D}. The area interpolation $\alpha_n$ corresponds to the first training result A, the second training result B, the third training result C, and the fourth training result D. Further, a corresponding first temporary area interpolation is assigned to each of the feature blocks according to the first training result A and the position mapping relationship, a second temporary area interpolation is assigned according to the second training result B, a third temporary area interpolation is assigned according to the third training result C, and a fourth temporary area interpolation is assigned according to the fourth training result D, as shown in FIG. 6. However, an actual quantity of the training samples is not limited thereto. More training samples and difference calculation may be performed where a calculation capability is sufficient. Thus, the interpolation parameter 210 is expressed as the following equation:

$$I_n(u,v)=A^*\alpha_A(u,v)+B^*\alpha_B(u,v)+C^*\alpha_C(u,v)+D^*\alpha_D(u,v) \quad \text{Equation 3}$$

Blocks at an upper part of FIG. 6 show each set of the training results (which are respectively training results A, B, C, and D) in the interpolation parameter $I_n(u,v)$. A dashed-line box at a lower part of FIG. 6 show area interpolations 117 included in the first training result A, the second training result B, the third training result C, and the fourth training result D.

According to the image processing method and system for a CNN, new interpolation parameters 210 are obtained by means of adjustment by using the plurality of sets of training results and the area interpolations 117, and the output features of the feature blocks 118 are further obtained according to the new interpolation parameters 210. In addition, by segmenting the input image data 112, the processor 120 can use all operation resources on the processing of the feature blocks 118, so as to reduce the operation workload of the processor 120 for large input samples. Moreover, the processor 120 may perform the foregoing processing on each convolutional layer of the CNN, so as to adjust the discontinuous splicing of borders of the blocks.

What is claimed is:

1. An image processing method for a convolutional neural network (CNN), the image processing method comprising:
   obtaining input image data, a first training result, a second training result, and an interpolation lookup table, wherein the interpolation lookup table comprises a plurality of area interpolations;
   segmenting the input image data into a plurality of feature blocks according to a total quantity of the area interpolations;
   establishing a position mapping relationship to record the feature blocks corresponding to positions of all of the area interpolations;
   assigning corresponding area interpolations to the feature blocks according to the position mapping relationship;
   obtaining an interpolation parameter for each of the feature blocks according to the first training result, the second training result, and the area interpolations;
   performing block convolution on each of the interpolation parameters and the corresponding feature block to obtain an output feature result; and
   obtaining an output image by combining the output feature results according to the position mapping relationship.

2. The image processing method for a CNN according to claim 1, wherein before the step of obtaining the interpolation lookup table, the image processing method comprises:
   selecting a first convolutional operation layer of a CNN; and
   inputting the input image data to the first convolutional operation layer.

3. The image processing method for a CNN according to claim 2, wherein the step of obtaining the output image comprises:
   selecting a second convolutional operation layer of the CNN;
   setting the output image obtained in the first convolutional operation layer as new input image data of the second convolutional operation layer; and
   obtaining the output image of the second convolutional operation layer.

4. The image processing method for a CNN according to claim 3, wherein before the step of obtaining the interpolation lookup table, the image processing method comprises:
   respectively configuring corresponding interpolation lookup tables for the first convolutional operation layer and the second convolutional operation layer; and
   selecting a corresponding one of the interpolation lookup tables according to the first convolutional operation layer or the second convolutional operation layer.

5. The image processing method for a CNN according to claim 1, wherein the step of segmenting the input image data into the feature blocks according to the total quantity of the area interpolations comprises:
   calculating a first area of each of the feature blocks according to the interpolation quantity and the input image data; and
   enlarging the first area of each of the feature blocks to a second area to form an overlapping region between two adjacent feature blocks.

6. The image processing method for a CNN according to claim 5, wherein the step of obtaining the output image by combining the interpolation parameters according to the position mapping relationship comprises:
   superimposing overlapping regions corresponding to two adjacent interpolation parameters according to the position mapping relationship; and
   obtaining the output image.

7. The image processing method for a CNN according to claim 1, wherein the step of obtaining the interpolation parameter for each of the feature blocks according to the first training result, the second training result, and the area interpolations comprises:
   assigning a first temporary area interpolation to each of the corresponding feature blocks according to the first training result and the position mapping relationship;
   assigning a second temporary area interpolation to each of the corresponding feature blocks according to the second training result and the position mapping relationship; and
   obtaining the interpolation parameter of a corresponding position according to the first training result, the second training result, the first temporary area interpolation, and the second temporary area interpolation.

8. An image processing system for a CNN, the image processing system comprising:
   a storage unit, configured to store a CNN program, input image data, at least one interpolation lookup table, a first training result, a second training result, and an output image, wherein the interpolation lookup table comprises a plurality of area interpolations, and a total quantity of the area interpolations is an interpolation quantity; and
   a processor, configured to execute the CNN program according to the input image data and the interpolation lookup table, wherein the processor segments the input image data into a plurality of feature blocks according to the interpolation quantity and a position mapping relationship, assigns a corresponding area interpolation to each of the feature blocks according to the position mapping relationship, calculates an interpolation parameter of each of the feature blocks according to the first training result, the second training result, and the area interpolations, and obtains the output image by combining the interpolation parameters according to the position mapping relationship.

9. The image processing system for a CNN according to claim 8, wherein the CNN program comprises a first convolutional operation layer and a second convolutional operation layer, an output of the first convolutional operation layer is connected to the second convolutional operation layer, and the first convolutional operation layer and the second convolutional operation layer respectively have the interpolation lookup table.

10. The image processing system for a CNN according to claim 9, wherein the processor inputs the input image data to the first convolutional operation layer, and selects the corresponding interpolation lookup table according to the first convolutional operation layer.

11. The image processing system for a CNN according to claim 8, wherein an overlapping region is formed between two adjacent feature blocks, and the processor calculates the interpolation parameters in the overlapping region according to the first training result, the second training result, and the area interpolations, and obtains the output image according to the position mapping relationship.

* * * * *